United States Patent [19]

Banno et al.

[11] Patent Number: 4,675,749

[45] Date of Patent: Jun. 23, 1987

[54] DISC PLAYER SYSTEM WITH DIGITAL INFORMATION DEMODULATION OPERATION

[75] Inventors: Tsutomu Banno; Minoru Kosaka, both of Tokorozawa, Japan

[73] Assignee: Pioneer Electronic Corporation, Tokyo, Japan

[21] Appl. No.: 712,106

[22] Filed: Mar. 15, 1985

[30] Foreign Application Priority Data

Mar. 16, 1984 [JP] Japan ................................ 59-051653
Sep. 14, 1984 [JP] Japan ................................ 59-193702

[51] Int. Cl.⁴ .......................... H04N 5/76; G11B 7/00
[52] U.S. Cl. ........................................ 358/342; 369/59
[58] Field of Search .............. 358/336, 337, 339, 342, 358/343; 360/32, 36.2, 38.1; 369/50, 59

[56] References Cited

U.S. PATENT DOCUMENTS 4,224,642 9/1980 Mawatari et al. .................. 360/38.1
4,477,842 10/1984 Kaneko ................................ 358/336
4,530,073 7/1985 Higashihara et al. ................. 369/50

Primary Examiner—Donald McElheny, Jr.
Attorney, Agent, or Firm—Schwartz, Jeffery, Schwaab, Mack, Blumenthal & Evans

[57] ABSTRACT

A system for playing back information recorded on a recording disc including a memory for storing a demodulated signal information. A read out clock signal generator produces a read out clock signal synchronized with a playback clock signal obtained according to information reproduced from the recording disc. The system is further provided with means for monitoring a memory utilization factor of the memory and a control signal is produced according to the result of the monitoring of the memory utilization factor. Thus, an overflow of the demodulated digital data in the memory is prevented.

11 Claims, 9 Drawing Figures

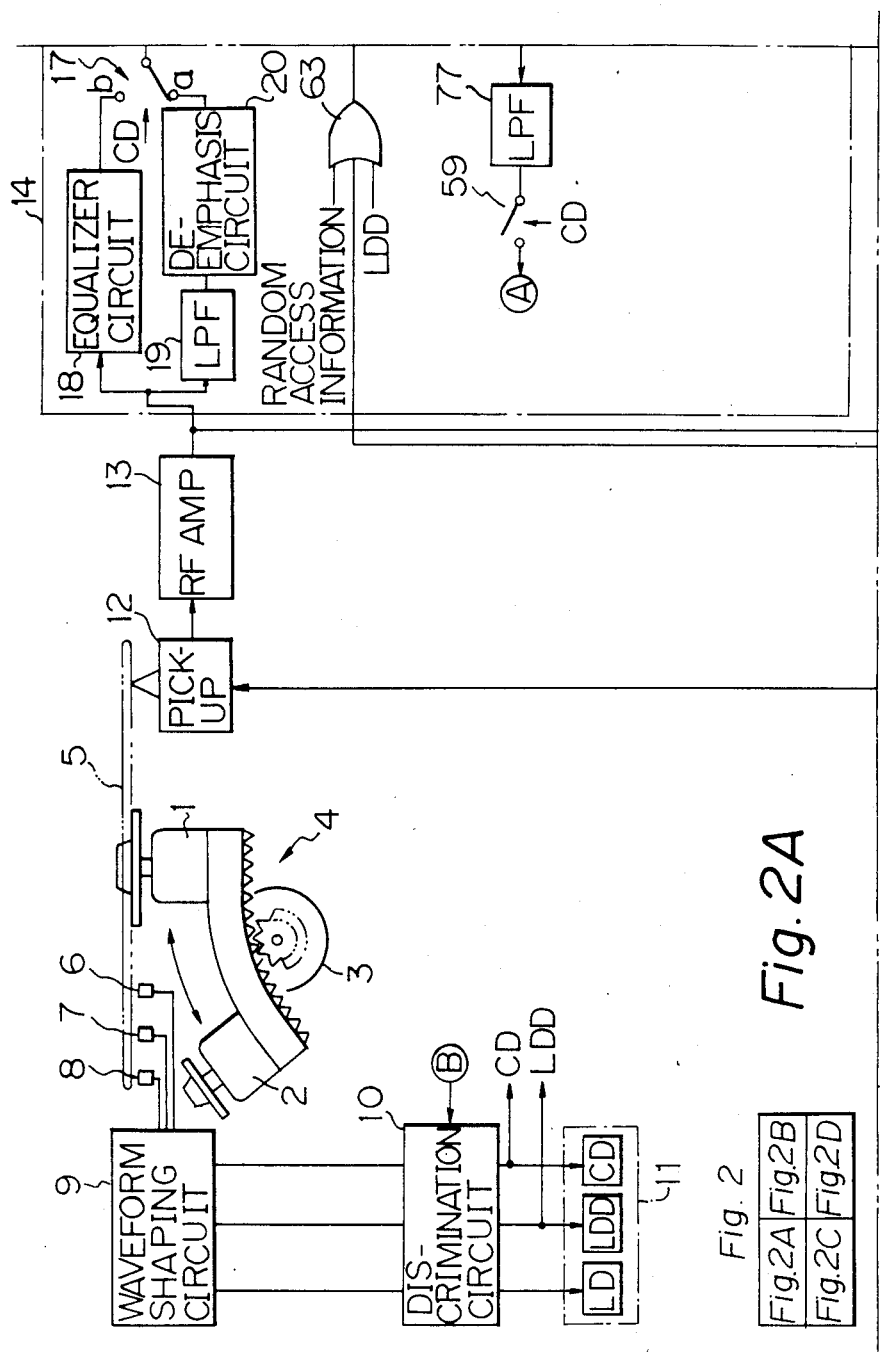

DISC PLAYER SYSTEM WITH DIGITAL INFORMATION DEMODULATION OPERATION

BACKGROUND OF THE INVENTION

1. Field of the Invention

The present invention relates to a system for playing back information recording disc, and more specifically to a system for playing back a recording disc which carries digitally processed information. The invention further relates to a system, to be used in the disc player system, for demodulating a PCM digital signal recorded on an information recording disc.

2. Description of Background Information

As a recording disc on which digital signals are recorded, the so called digital audio disc, that is, the compact disc (designated as the CD generally), is known in which audio signals are treated by a predetermined digital modulation process and recorded on the disc in the form of a pulse train. Recently, in addition, a type of video disc has been developed in which an audio signal which is digitalized by a predetermined digital modulation method and converted to a pulse train signal is superimposed on FM (frequency modulated) signals representing a video signal and the audio signal. The recording is performed with the thus produced recording signal.

The details of this type of video disc (referred to as the LDD hereinafter) are, for instance, described in Japanese Patent Application No. 58-45780.

In the recording process of this type of disc, two audio signal channels are processed and two carrier signals of 2.3 MHz and 2.8 MHz, as audio carrier signals, are modulated in frequency by the audio signals, respectively. In addition, the video signal is converted in frequency so that the sync tip frequency is at 7.6 MHz, Pedestal level is at 8.1 MHz, and White Peak is at 9.3 MHz respectively.

The above audio signals are also digitalized and transformed to a pulse train signal according to a modulation method such as the PCM (Pulse Code Modulation) process.

The pulse train signal takes the form of a signal suited for recording, obtained by a process such as the EFM (Eight to Fourteen Modulation) process for example, and the frequency spectra of the audio signal are transformed to frequency components of the pulse train which comprises pulses having a width in the range 3T through 11T.

In this expression, T represents the bit period of the PCM signal, 3T corresponds to 720 KHz, and the maximum width 11T corresponds to 200 KHz.

The pulse train signal having this characteristic is superimposed on the video main carrier signal at a level less than 1/10 of that of the main carrier and then sliced and amplified at around the zero-crossing point. The pulse width modulation signal thus produced is used as the recording signal.

In the CD (Compact Disc) player systems, the demodulation system of the PCM digital signal is generally constructed such that a read out clock signal is fixed in frequency and the rotation of the recording disc is synchronized in phase with respect to the read out clock signal. Further, jitter is removed by reading out information which is temporarily stored in a memory in synchronism with the read out clock signal, which information is stored in the memory in synchronism with a write clock signal synchronized with a playback clock signal.

In the case of the above mentioned LDD, on the other hand, in the demodulation of the digital signal picked up from the playback signal, the playback signal is already synchronized with a reference (clock) signal for the video synchronization. Therefore, if in the PCM demodulation system, the data is read out from the memory using a different reference (clock) signal which is used in the general CD players, there will be inevitably a time difference between the playback video signal and the reproduced audio signal due to a slight phase difference between these two reference signals.

In addition, if the read out clock signal is advanced in phase with respect to the write clock signal, the memory may become empty. Conversely, if the write clock is advanced with respect to the read out clock, an overflow of the memory will occur.

Further, in the time of developing a compatible player system which is capable of playing both of the CD and LDD, various problems such as the aforementioned must be solved for using a demodulation system commonly for the processing of a CD output signal and the processing of an LDD output signal for the purpose of cost reduction.

Moreover, for the generation of the aforementioned write clock signal in accordance with the playback clock signal contained in the playback digital signal, it is general to use a PLL (Phase Locked Loop) circuit including a voltage controlled oscillator for generating the write clock signal and a phase comparator for generating a control voltage for the voltage controlled oscillator in accordance with a phase difference between the playback clock signal and the write clock signal. However, in such a time as a transitional time of a spindle servo system for driving a spindle motor from an unlocked state to a locked state, or as a time when a random access command such as the scan, search, or jump commaned is cancelled, the period for the lock-in of the PLL circuit tends to be prolonged because the playback clock signal is not stable before that time.

On the other hand, in some of the conventional CD players, an oscillator for controlling the rotation of the recording disc is provided separately. The frequency and the phase of the playback clock signal are also determined in accordance with the rotation of the recording disc. However, there can be errors of the frequency and the phase of an oscillation signal of the above mentioned oscillator for controlling the rotation of the recording disc, with respect to the frequency and the phase of the above mentioned read out clock signal generated by a read out clock signal oscillator due to a temperature change and so on. If the frequency of the read out clock signal becomes lower than the frequency of the writing signal which is determined by the frequency of the playback clock signal, the memorized data will remain in the memory due to the drop of the read out clock signal frequency. Therefore, it is necessary to provide a large enough memory capacity. Thus the size of the memory must be enlarged as the magnitude of an estimated error becomes large.

SUMMARY OF THE INVENTION

An object of the present invention is therefore to alleviate the above discussed problem and to provide a playback system for playing back information recorded on a recording disc, in which the memory is always used under a proper condition and which is capable of obtaining a digital signal free from jitter by positively suppressing a jitter component included in the playback digital signal.

Another object of the present invention is to provide a playback system in which the time required for the lock-in of the PLL circuit for generating a write clock signal is shortened so that the demodulation operation of the playback digital signal is smoothly started from the other state of operation.

Further object of the present invention is to provide a digital signal reproducing system in which the jitter of the playback signal can be removed without increasing the memory size.

A playback system for playing back information recorded on a recording disc according to the present invention, includes demodulating means for demodulating a playback digital signal, writing means for writing the demodulation signal from the demodulation means into a memory in synchronism with a playback clock signal contained in the playback digital signal, clock signal generating means for generating a read out clock signal for reading out stored information from the memory, phase synchronizing means for synchronizing the phase of the output signal of the clock signal generating means with the playback clock signal, monitoring means for monitoring the memory utilization factor and producing signals corresponding to the memory utilization factor, and control means for controlling the frequency of the read out clock signal from the clock signal generating means.

According to another aspect of the present invention, a system for playback information recorded on a recording disc includes means for inhibiting the synchronizing operation of phase synchronizing means operable to synchronize in phase a read out clock signal with a playback clock signal, and for fixing the frequency of the read out clock signal at a contant value.

According to further aspect of the invention, a system for playing back information recorded on a recording disc includes means for generating a clock signal synchronized with a playback clock signal contained in a playback clock signal, which means having a voltage controlled oscillator for generating the clock signal, a phase comparator for comparing in phase the playback digital signal and the clock signal, and generating a control voltage for the voltage controlled oscillator, and a change-over switch for alternatively supplying said control voltage and a reference voltage of a predetermined level.

According to still another aspect of the invention, a system for reproducing digital information includes demodulator means for demodulating a playback digital signal, writing means for writing the playback digital signal in a memory in accordance with a playback clock signal contained in the playback digital signal, clock signal generating means for generating a clock signal for reading the recorded information from the memory, and phase synchronizing means for synchronizing the phase of the output clock signal of the clock signal generating means with the playback clock signal.

According to further aspect of the invention, the system for demodulating digital information further includes means for converting output signals from the memory into analog signals.

Further scope and applicability of the present invention will become more apparent from the detailed description given hereinafter. However, it should be understood that the detailed description and specific examples, while indicating prefered embodiments of the invention, are given by way of illusration only, since various changes and modifications within the spirit and scope of the invention will become apparent to those skilled in the art from this detailed description.

BRIEF DESCRIPTION OF THE DRAWINGS

FIG. 2 illustrates the meaning of interconnecting FIGS. 2A-2D;

FIGS. 2A through 2D, when combined, are a block diagram showing an embodiment of the system for playing information recording disc;

DETAILED DESCRIPTION OF THE PREFERRED EMBODIMENTS

Figure 1:
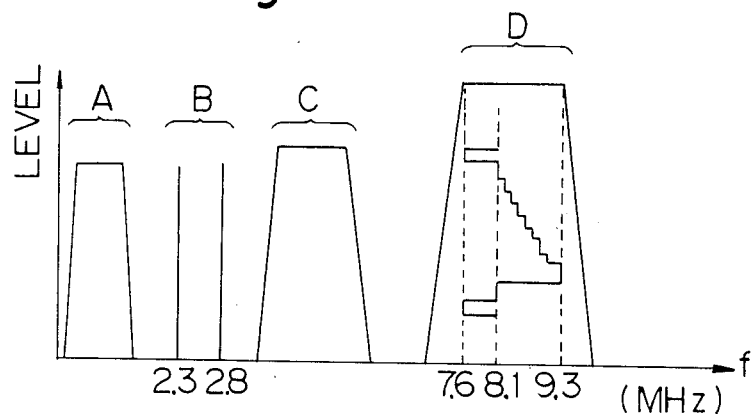
FIG. 1 is a diagram illustrating the frequency spectrum of an RF signal picked up from a recording disc on which a recording sigal which comprises a pulse signal obtained by the PCM process of an analog signal superimposed on frequency modulated signals of a video signal and an audio signal is recorded.

Before entering into the explanation of preferred embodiments according to the present invention, reference is first made to FIG. 1 which shows a frequency spectrum of an RF (Radio Frequency) signal obtained from a recording disc on which the video signal and the audio signal are recorded according to the aforementioned recording process.

In FIG. 1, the letter A indicates the component of the digitalized audio signal, B indicates the audio FM signal component, C indicates a color information components of the video FM signal, and D indicates a luminance information component of the video FM signal.

Since the maximum dynamic range of the digitalized audio signal is at around or above 90 dB, the quality of the digtially processed sound is much improved as compared with the audio signal recorded and played back using a conventional FM modulation process.

Preferred embodiments of the system for playing back information recorded on a recording disc will be described with reference to FIGS. 2A-2C through 4 of the accompanying drawings.

Figure 2B:
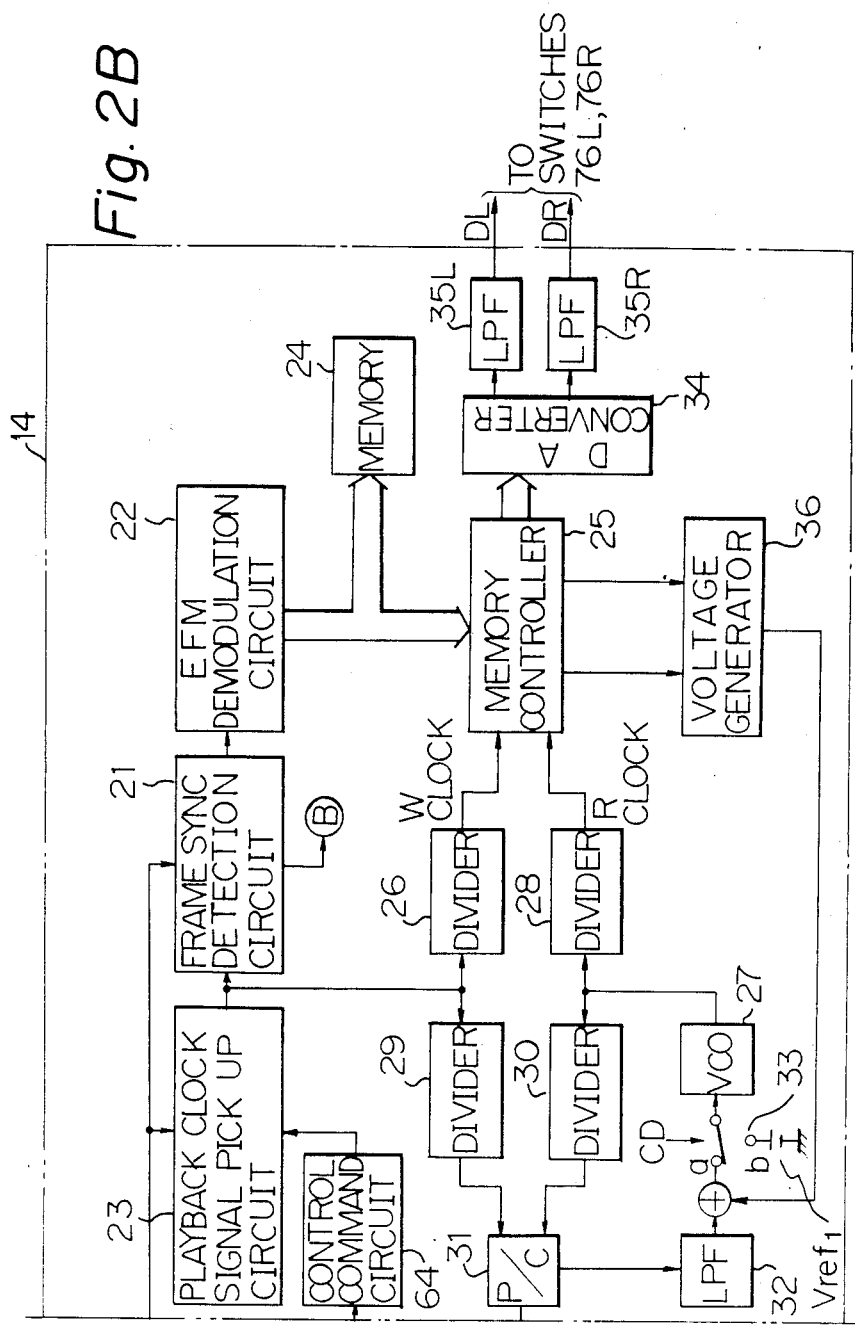
Figure 2C:
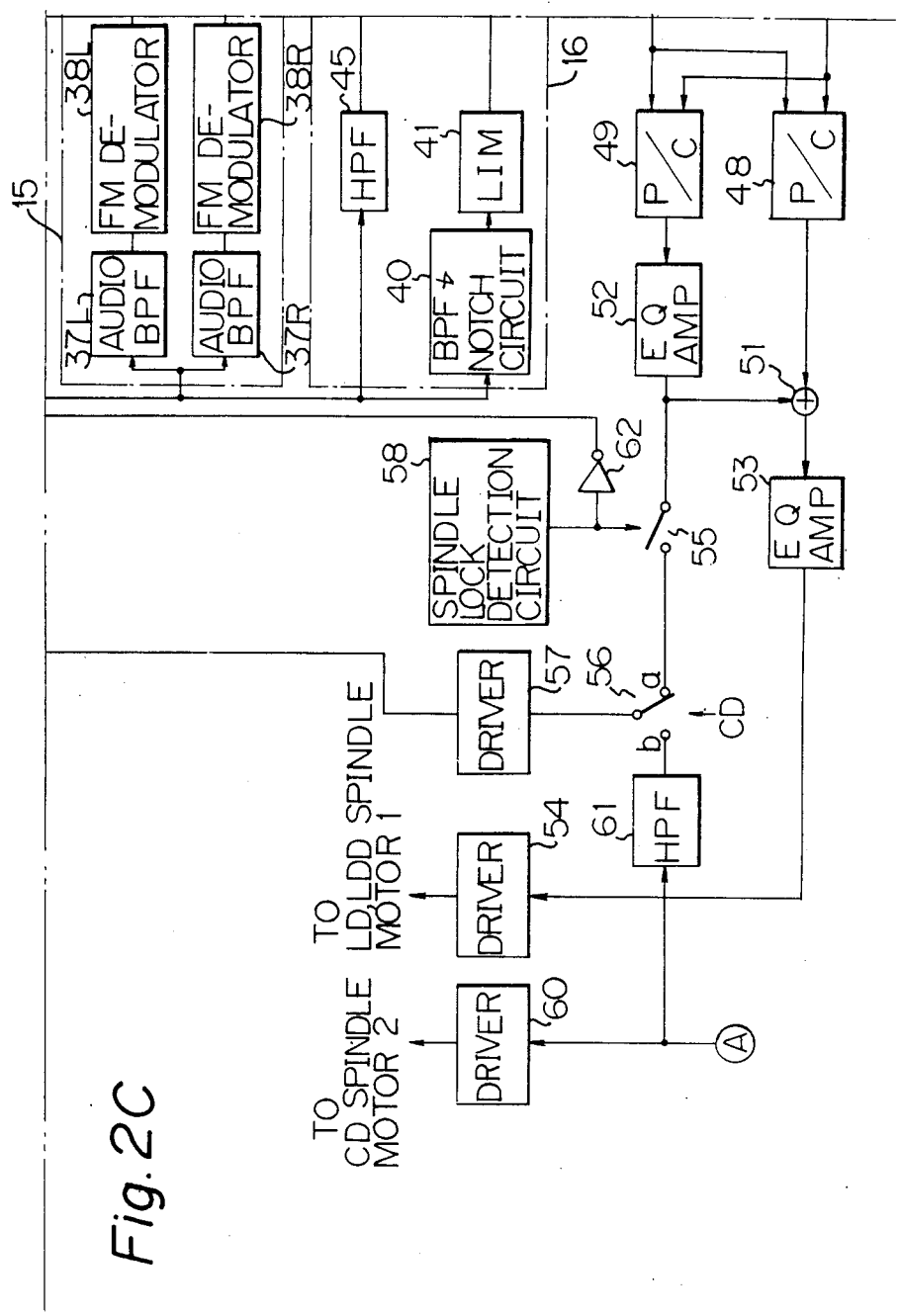

In FIGS. 2A-2C, there is illustrated the so called compatible disc player system which is capable of playing, as well as the CD and the LDD, an ordinary video disc on which the video signal and the audio signal are recorded by the frequency modulation process respectively.

In FIG. 2A, since the rotating speed of the disc is different between the digital audio disc (CD) and the video disc (LD and the LDD), the player system is provided with a first spindle motor 1 for driving the LD and the LDD and a second spindle motor 2 for driving the CD. The first and second spindle motors 1 and 2 are alternatively selected according to the type of the disc to be played, and changed-over through a swing motion by means of a change-over mechanism driven by a motor 3.

For detecting the disc size of a disc 5 to be played, there are provided three detection sensors 6, 7 and 8 arranged in order in a radial direction from the center of the disc, at positions corresponding to the diameter of the discs having different disc size. The disc size is 5 inches (about 12 centimeters) in diameter for the compact disc, and 8 inches or 12 inches in diameter for the video disc (the LD and the LDD). Output signals of three detection sensors 6, 7 and 8 are applied to a waveform shaping circuit 9 where the waveform shaping is performed. An output signal of the waveform shaping circuit 9 is, in turn, supplied to a disc discrimination circuit 10. The detection sensors 6, 7, and 8 are for example an optical sensor respectively. However, it is not limited to this type of sensor.

In the disc discrimination circuit 10, the type of the disc to be played is detected, as the CD, the LD, or the LDD, in accordance with the output signals of the detection sensors 6, 7, and 8.

Figure 3:
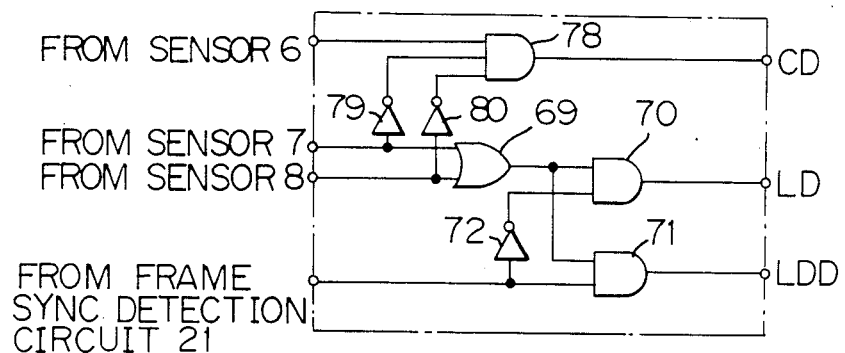
FIG. 3 is a circuit diagram showing the construction of the disc discrimination circuit used in the disc player system of FIG. 2.

FIG. 3 illustrates the concrete circuit construction of the disc discrimination circuit 10.

The size of the CD is the smallest (12 cm) and the detection sensor 6 is located in the innermost position. Therefore, in the case of this disc discrimination circuit shown in FIG. 3, an output signal of an AND gate circuit 78 which receives an output signal of the detection sensor 6, and inverted signals of output signals of the detection sensors 7 and 8 supplied via inverters 79 and 80, is utilized as a CD detection information. Specifically, when the detection sensor 6 is "on" and the other detection sensors 7 and 8 are "off", the disc to be played is detected as a CD disc. In the case of the video disc, the disc size is 8 inches or 12 inches. Therefore, the output signals of the detection sensors 7 and 8 are applied to AND gate circuits 70 and 71 via an OR gate 69. The other input terminal of the AND gate circuit 71 is supplied with a frame sync detection signal which is periodically produced when a frame sync signal is detected at a frame sync detection circuit 21 which will be described later. This frame sync detection signal is inverted at an inverter 72 and supplied to the other input terminal of the AND gate circuit 70. With this construction, a LDD detection information is produced when the frame sync signal is input while the output signal is being produced at the detection sensors 7 and 8. On the other hand, if the frame sync signal is not supplied, then a the LD detection information is produced at the AND gate circuit 70.

Turning to FIG. 2A once more, these disc discrimination informations are used for driving an indicator 11 for indicating the type of the disc, and used as control signals for various switches which will be described later.

A pickup 12 for reading information from the disc 5 is carried by a slider base (not shown) which is slidably disposed on a radial direction of the disc 5. The slider base is driven by a drive mechanism which includes a slider motor, a reduction gear, and so on. The information read out from the recording disc 5 by means of the pickup 12 is applied an RF amplifier 13, and in turn to a digital information demodulation system 14 of FIGS. 2A and 2B, an analog audio demodulation system 15, and to a video demodulation system 16, both illustrated in FIGS. 2C and 2D. The RF amplifier 13 has a broad bandwidth ranging 5 KHz through 14 KHz, and it is capable of amplifying a playback PCM audio signal, a playback FM audio signal, and a playback video signal, as a single amplifier.

In FIGS. 2A and 2B, the digital information demodulation system 14 includes a change-over switch 17 which is operated according to the type of the disc to be played back. The change-over switch 17 is actuated on the side of the contact a in the case of the LDD and on the side of the contact b in the case of the CD according to the disc information from the disc discrimination circuit 10. In other words, the system for processing the playback digital signal is switched over depending on the playback of the LDD and the playback of the CD.

In the case of the playing of the CD, the playback RF signal represents the PCM audio information, and this PCM audio information is processed by a MTF (Modulation Transfer Function) compensation at an equalizer circuit 18.

On the other hand, in the case of the playing of the LDD, the PCM audio information which is contained in the playback RF signal as well as the frequency modulated audio information and the frequency modulated video information is picked up at a LPF (Low Pass Filter) 19 and in turn applied to a de-emphasis circuit 20. The PCM audio information, for example, takes the form of an EFM signal. However, the recording is performed such that the low frequency component of the PCM signal is boosted because the digital signal component is disturbed by the low frequency component of the FM video signal if the digital signal itself is superimposed on a frequency modulated video signal.

Therefore, a compensation process is performed at the playback time, so that the low frequency component which is boosted at the time of recording is reduced by means of a de-emphasis circut 20. By this provision, the S/N of the digital signal especially with respect to the low frequency noise signals can be improved through the recording and playback process.

In addition, instead of the change-over operation by means of the change-over switch 17, the system can be so constructed that the power supply of each signal processing system is "on/off" controlled.

The EFM signal through the change-over switch 17 is supplied to an EFM demodulation circuit 22 via the frame sync detection circuit 21 and also supplied to a playback clock pickup signal circuit 23. With a playback clock signal picked up at the playback clock signal pickup circuit 23, the EFM signal is demodulated to the PCM digital signal at the EFM demodulation circuit 22.

The demodulated PCM digital signal is then written in a memory 24 such as the RAM (raondom Access Memory) in accordance with the control of the memory controller 25. In this time, the memory controller 25 performs the writing in synchronism with a write clock signal which is a divided signal of the playback clock signal by means of a divider 26.

The read out of the stored information from the memory 24 is performed in synchronism with a read out clock signal obtained by dividing, by means of a divider 28, an oscillation signal of a VCO (Voltage Controlled Oscillator) 27 of a PLL (Phase Locked Loop) circuit. This PLL circuit includes the above mentioned VCO 27, a phase comparator (P/C) 31 which receives two dividing signals, i.e., a divided signal of the playback clock signal by means of a divider 29 and a divided signal of the oscillation signal of the VCO 27 by means of a divider 28. The PLL circuit further includes a LPF (Low Pass Filter) 32 for receiving an output signal of the phase comparator 31, and a change-over switch 33 for alternatively supplying the, output voltage of the LPF 32 and a reference voltage Vref1 provided from a souce of reference voltage.

In this PLL circuit, the change-over switch 33 is operated according to the result of the discrimination at the discrimination circuit 10. Specifically the change-over switch is operated on the side of the terminal a at the time of the playing of the LDD so as to provide the output signal of the LPF 32 to the VCO 27, and on the side of the terminal b at the time of the playback of the CD so as to provide the voltage Vref1 to the VCO 27. With this procedure, the read out clock signal for reading out the stored information from the memory 24 is synchronized with the playback clock signal by means of the operation of the PLL circuit. Therefore, at the time of the playback of the CD, a loop switch 55 which will be described later is turned on and the output signal of the phase comparator 31 is applied via a LPF 77 to drive the second spindle motor 2 for driving the CD. Thus, the playback clock signal is synchronized in phase with a fixed clock signal obtained from the VCO 27 whose bias is in the fixed condition.

The digital signal thus read out from the memory 24 is converted to an analog audio signal by means of a D/A (Digital to Analog) converter 34, and output as left and right playback audio signals via LPFs 35L and 35R.

With this construction, the memory utilization factor of the memory 24 is always monitored by the memory controller 25 which produces information indicative of such a state that the overflow occurs in the memory 24 or a state that the memory 24 is empty, and provides such information to a voltage generator 36. At the time of playback of the LDD, the voltage generator 36 produces, in accordance with the information from the memory controller 25 indicative of the memory utilization factor of the memory 24, a positive control signal when the overflow occurs, and a negative control signal when the memory 24 becomes empty. The output signal of the voltage generator 36 is superimposed on the output signal of the LPF 32 and supplied the VCO 27 via the change-over switch 33. In this way, the frequency of the read out clock signal is controlled.

Thus, by continuously monitoring the amount of the data stored in the memory 24 and producing the positive or the negative control votage if there is a shortage or excess of the processing capacity of the memory 24, the PLL circuit is operated to deal with this unusual state. Thus, the memory 24 is always maintained at the normal operating condition.

Figure 2D:
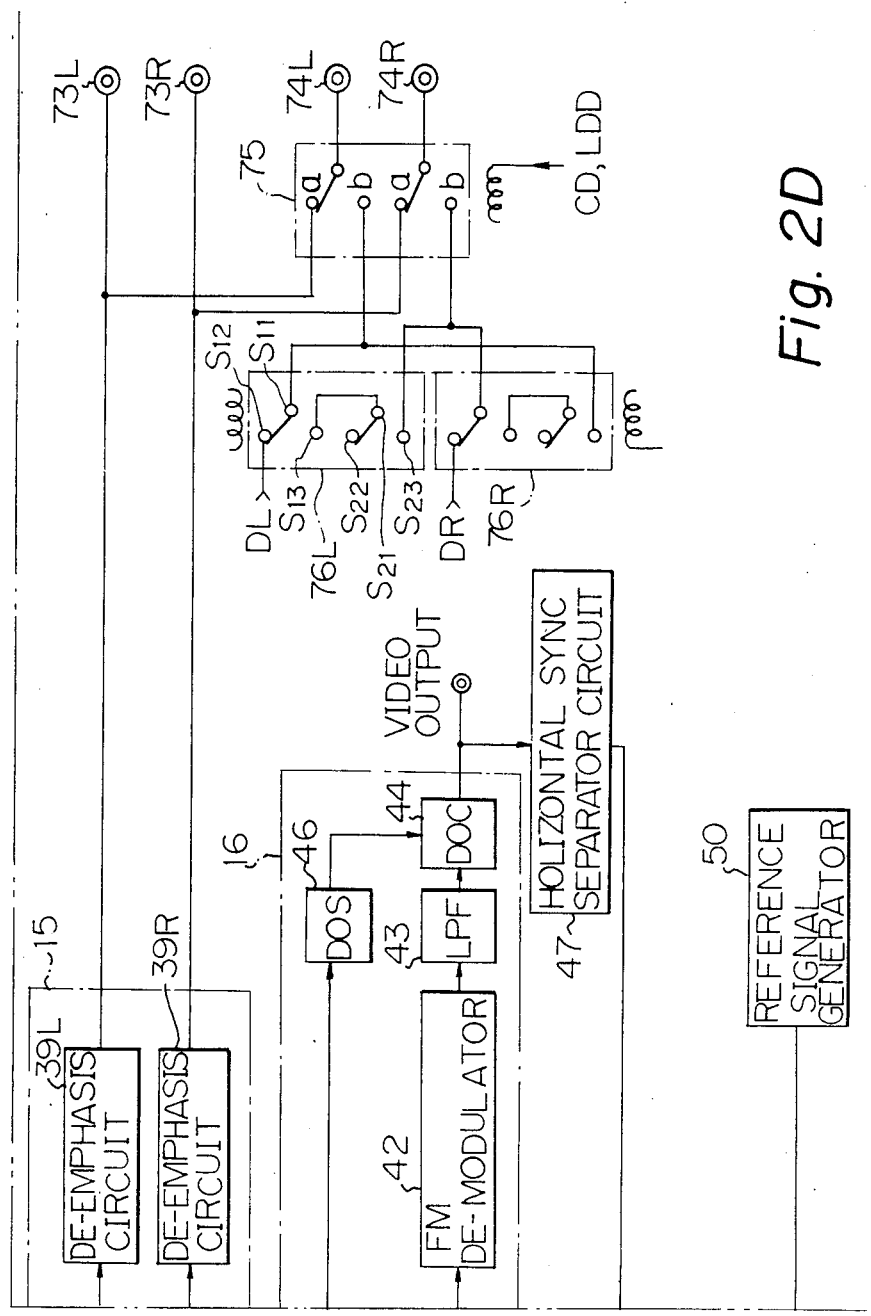

In FIGS. 2C and 2D, the analog audio demodulation system 15 includes BPFs (Band Pass Filters) 37L and 37R which allow only the audio carrier frequency components of 2.3 MHz and 2.8 MHz. Output signals of the BPFs 37L and 37R are applied to FM demodulators 38L and 38R where the input signals are treated by an FM demodulation process and in turn output as left and right playback audio signals via de-emphasis circuits 39L and 39R.

In the video demodulation system 16, the playback RF signal is applied to a BPF and notch circuit 40 where only the video information is picked up. In the BPF and notch circuit 40, the EFM signal component which is contained in the playback RF signal in the case of the playback of the LDD and the audio carrier components of 2.3 MHz and 2.8 MHz are positively removed. The thus picked up information is in turn supplied to an FM demodulator 42 via a limiter 41, for the frequency demodulation. The demodulated output signal from the FM demodulator 42 is in turn supplied to a DOC (drop out compensator) 44 via a LPF 43, for the drop out compensation. A DOS (drop out sensor) 46 is provided for sensing the drop out in accordance with the playback RF signal which is supplied via a HPF (High Pass Filter) 45 for example. The DOC 44, for example includes an analog switch which turns off upon receipt of an output signal of the DOS 46, and a hold capacitor provided between an output terminal of the analog switch and a circuit point of a reference potential.

When the drop out occurs, the level of the output signal of the LPF 43 immediately before the generation of an output signal of the DOS 46 is held and supplied to the circuit of the next stage. The drop out compensation is performed in this way. The output signal of this DOC 44 is output as the video output signal.

The output signal of the DOC 44 is also supplied to a horizontal sync separator circuit 47 by which the holizontal synchronization signal is separated and in turn output. The holizontal sync signal is supplied to phase comparators 48 and 49 where a phase difference between the holizontal sync signal and a reference signal supplied from a reference signal generator 50 is detected. The output signal of the phase comparator 48 is applied to an adder 51 at a negative input terminal thereof and an output signal of the comparator 49 is applied to the adder 52 via an equalizer amplifier 52 at the other input terminal thereof. The output signal of the adder 51 is supplied to an equalizer amplifier 53 and then to a driver 54 so as to drive the first drive motor 1 for rotating the LD and the LDD. These circuit portions form a spindle servo system.

The output signal of the equalizer amplifier 52 is supplied to the loop switch 55, a change-over switch 56, and a driver 57 so as to drive a bulit-in (not shown) actuator of the pickup 12. By the operation of this actuator, a light spot for reading the information is moved along a tangential direction of the recording track of the disc. These portion form a tangential servo system. The actuator, for example, consists of a tangential mirror which moves the postion of the light spot on the disc along the tangential direction of the recording track by mean of its angular displacement. Further, it is also possible to use a structure in which the lens can be shifted in a direction perpendicular to a light axis so that the information reading light spot is moved along the tangential direction of the recording track.

The loop switch 55 turns "on" in response to a spindle lock signal which is generated at a spindle lock detection circuit 58 when the clocking of the spindle servo system is almost completed. In other words, at the time of the start of the playback, the spindle motor 1 is started to rotate in accordance with the output signal of the phase comparator 48 and a coarse adjustment of the time axis (spindle servo control) is performed first. When the locking of the spindle servo is almost completed by this operation, the loop switch 55 turns on and in turn the actuator is started to be operated in accordance with the output signal of the phase comparator 49. In this way, a fine control of the time axis (tangential servo) is performed. In accordance with this operation, it becomes possible to remove a residual jitter component, in accordance with the operation of the tangential servo system, which can not be removed by the operation of the spindle servo system.

However, even in the tangential servo system, the mechanical system of the actuator drive mechanism can not follow a high frequency component of the residual jitter component. Thus, it is not possible to remove the jitter completely.

Accordingly, in the aforementioned digital information demodulating system 14, the cut-off frequency of the LPF 32 of the PLL circuit for generating the read out clock signal is set at a frequency level lower than the highest frequency of the frequency range of the above mentioned tangential servo loop, so that the high frequency component of the residual jitter is cut-off.

In this way, the residual jitter component is completely removed. Preferably, if the cut-off frequency of the LPF 32 is set at a frequency lower than an off-center frequency (30–8 Hz for the LDD), a jitter component originated by the off-center of the disc can be also removed completely.

In the above explanation, the spindle servo system and the tangential servo system are operated in accordance with the holizontal sync signal. However it is to be noted that these systems can be also operated in accordance with a color carrier signal of 3.58 MHz which is contained in the playback FM video signal.

The servo systems of the playback time of the video disc (LD, the LDD) are described above.

In the case of the playback of the CD, the spindle servo is performed in accordance with the output signal of the phase comparator 31 of the above mentioned digital information demodulation system 14. Specifically, the output signal of the phase comparator 31 is supplied to the loop switch 55 which closes at the time of playback of the CD, and the driver 60, so as to drive the second spindle motor 2.

In conventional systems, the above mentioned tangential servo operation is not performed during the playback of the CD. However, since the second spindle motor 2 can not follow a high frequency component of the output signal of the phase comparator 31 sufficiently, the tangential servo control is also adopted in the system according to the present invention. In this tnagential servo control system, a high frequency component of the time axis error signal picked up at the HPF 61 is applied to the change-over switch 56 and the driver 57, so as to drive the actuator in the pickup 12. The change-over switch 56 is operated in accordance with the result of the detection of the disc discrimination circuit 10 and the movable contact is positioned at the contact a in the case of the playback of the LDD, the LD and positioned at the contact b in the case of the playback of the CD.

In addition, in the above example, the tagential servo system at the time of the playback of the CD is operated in accordance with the divided signal of the playback clock signal produced at the playback clock signal pickup circuit 23. However, it is possibe to construct the system so that the tangential servo system is operated in accordance with the divided signal of the frame sync signal detected at the frame sync signal detection circuit 21 because the frame sync signal is synchronized with the playback clock signal.

An output signal of the spindle lock detection circuit 58 is applied to an inverter 62 and in turn to an input terminal of an OR gate 63 as a signal indicative of a state that the spindle servo system is not in the locking state. To the other input terminal of the OR gate 63, a random access information signal is applied which is generated at the time of random access command of the search, jump etc. The OR gate 63 also receives the output signal of the LDD information produced at the disc discrimination circuit 10. An output signal of the OR gate 63 is applied to the playback clock pick up circuit 23 via a control command circuit 64.

Figure 4:
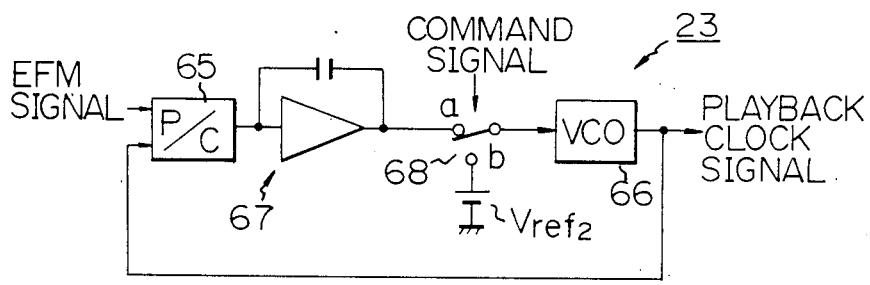
FIG. 4 is a block diagram showing the construction of the playback clock signal detection circuit used in the disc player system of FIG. 2.

FIG. 4 shows a concrete circuit construction of the playback clock signal detection circuit 23.

In FIG. 4, the playback EFM signal is compared in phase with the oscillation signal of a VCO (Voltage Controlled Oscillator) 66 at a phase comparator 65 in which a phase difference signal is produced.

The phase difference signal is then applied to the VCO 66 via a LPF 67 and a change-over switch 68. With these circuit parts, the PLL circuit for generating the playback clock signal is constructed.

Normally, the change-over switch 68 is positioned at the contact a and supplies the output signal of the LPF 67 to the VCO 66. When the command signal is output from the above mentioned control command circuit 64, the change-over switch is positioned at a contact b and supplies a predetermined reference voltage Vref2 produced at a predetermine source of reference voltage to the VCO 66. In other words, when the spindle servo system is not in the locked state, or when the information reading light spot moves accross a plurality of sections of the recording track in accordance with a random access command such as in the scan, search, jump operation, the reference voltage Vref2 is supplied to the VCO 66 so as to fix the oscillation frequency thereof at a frequency value near the frequency of the playback clock signal. Thus, lock-in of the playback clock signal is accerelated after the locking of the spindle servo system or the cancellation of a random access command.

In FIG. 2D, in the audio output part, there are provided a pair of output terminals 73L and 73R, that is, the left and right terminals of the analog audio output signals and a pair of output terminals 74L and 74R, i.e., the left and right terminals, for digital audio output signals.

The output terminals 73L and 73R are supplied with audio output signals from the analog audio demodulation system. These audio output signals are also supplied to the output terminals 74L and 74R via a change-over switch 75 at the time of the playback of the LD. The change-over switch 75 is for example, operated on the side of the normal terminals a in the case of the playback of the LD and operated on the side of the contacts b in the case of the playback of the LDD and the CD in accordance with the output signal of the disc discrimination signal produced at the disc discrimination circuit 10.

The audio output signals from the digital information demodulation system 14 is suppied to the output terminals 74L and 74R via left and right mode change-over switches 76L and 76R and the change-over switches 75L and 75R.

With this construction, the normal audio sigals are output through the terminals 73L and 73R in the case of playback of the LD and the high quality (digitally processed) audio signals are output through the output terminals 74L and 74R at the time of the playback of the LDD and the CD. Further, at the time of the playback of the LDD, the normal audio signals are also output through the output terminals 73L and 73R.

The mode change-over switchs 76L and 76R are provided to change-over the output mode of the audio signal in the digital audio system, in the analog stage. Specifically, when the audio output signals from the digital audio demodulation system 14 are stereophonic signals, it is sufficiant to use the above explained output mode. However, if the audio output signals are of the multivoice mode, the Left channel is in Japanese and the Right channel is in a foreign language, English for example. Therefore, by using independently operable mode change switches 76L and 76R, the signals to be output through the output terminals 74L and 74R are selected among three modes, that is, Japanese and the foreign language, Japanese, and the foreign language. The driving of the mode selection switches 76L and 76R is performed in accordance with a control information from an operation part (not illustrated).

As the mode change switches 76L and 76R, a pair of independently operable relays can be used. Generally, it is sufficient to use a relay having a movable contact and a pair of stationary contacts for changing-over signals. However, in this embodiment of the present invention, relays having an additional movable contact and two additional stationary contacts are used. Specifically, in the example of the relay 76 of the L channel, the relay 76 includes mutually interlocked two movable contacts S11 and S21, and two pairs of stationary contacts S12, S13, and S22, S23 provided correspondingly to the movable contacts S11 and S21. Among these stationary contacts, two stationary contacts S12 and S23 which are the remotest from each other are used as the input terminals for two input signals (audio signals of the left and right channels), and one (S11) of the movable contacts is used as an output terminal. With this configuration, two gaps are formed between the Left and Right signal lines, and the crosstalk between the Left and Right signals is positively prevented. Further, it will be appreciated that the crosstalk can be more positively prevented if further contacts and therefore further gaps are provided.

Additionary, although not illustrated in the figure, the system is provided with a focus servo system which controls the position of the pickup 12 with respect to the disc 5 in a direction perpendicular to the surface of the disc, and a tracking servo system for controlling the position of the pickup 12 in a radial direction of the disc. Therefore, it is desirable to switch-over error signal processing systems depending on the playback of the video disc (the LDD and the LD) and the playback of the digital audio disc (the CD). With this provision, a good servo control can be effected without regard to the type of the disc.

Further, the digital signal to be recorded in the CD or the LDD may be such a signal of digitalized picture information or control information for computer control, other than the signal including audio information.

It will be appreciated from the foregoing, according to the present invention, the playback system of a recording disc is constructed so that the memory utilization factor is always monitored and the frequency of the read out clock signal is controlled in accordance with the memory utilization factor. Therefore, the memory is always used in the normal condition and there is an advantage that, at the time of the random access command, the condition of the utilization of the memory is optimized immediately after the completion of the command, and the muting state of the output signal can be rapidly cancelled and after being released from the muting state, the jitter component contained in the playback digital signal is surely suppressed and the digital information free of the jitter component is obtained.

Further, according to the present invention, the read out clock signal for reading information stored in the memory is syncronized with the predetermined reference signal in the time of playback of the CD, and with the playback clock signal in the time of the playback of the LDD. With this feature, the digital signal demodulation system is commonly used to reduce the cost of the compatible disc player and to positively suppress the jitter component contained in the playback digital signal.

Moreover, for the playing the the LDD, the system is constructed so that the control voltage of the voltage controlled oscillator of the PLL circuit for generating the write clock signal is alternatively selected between the output signal of the phase comparator and the predetermined voltage which is equal to a voltage for operating the voltage controlled oscillator to produce the write clock signal of the proper frequency. Therefore, the period required for the lock-in of the PLL circuit is shortened by arbitrary selecting the predetemined voltage when the control of the disc drive is in the unlocked state or in the time of the random access command. Thus, the smooth entering into the digital signal demodulation process is enabled.

An embodiment of the playback signal demodulating system according to the present invention will be explained with reference to FIG. 5 of the accompanying drawings.

Figure 5:
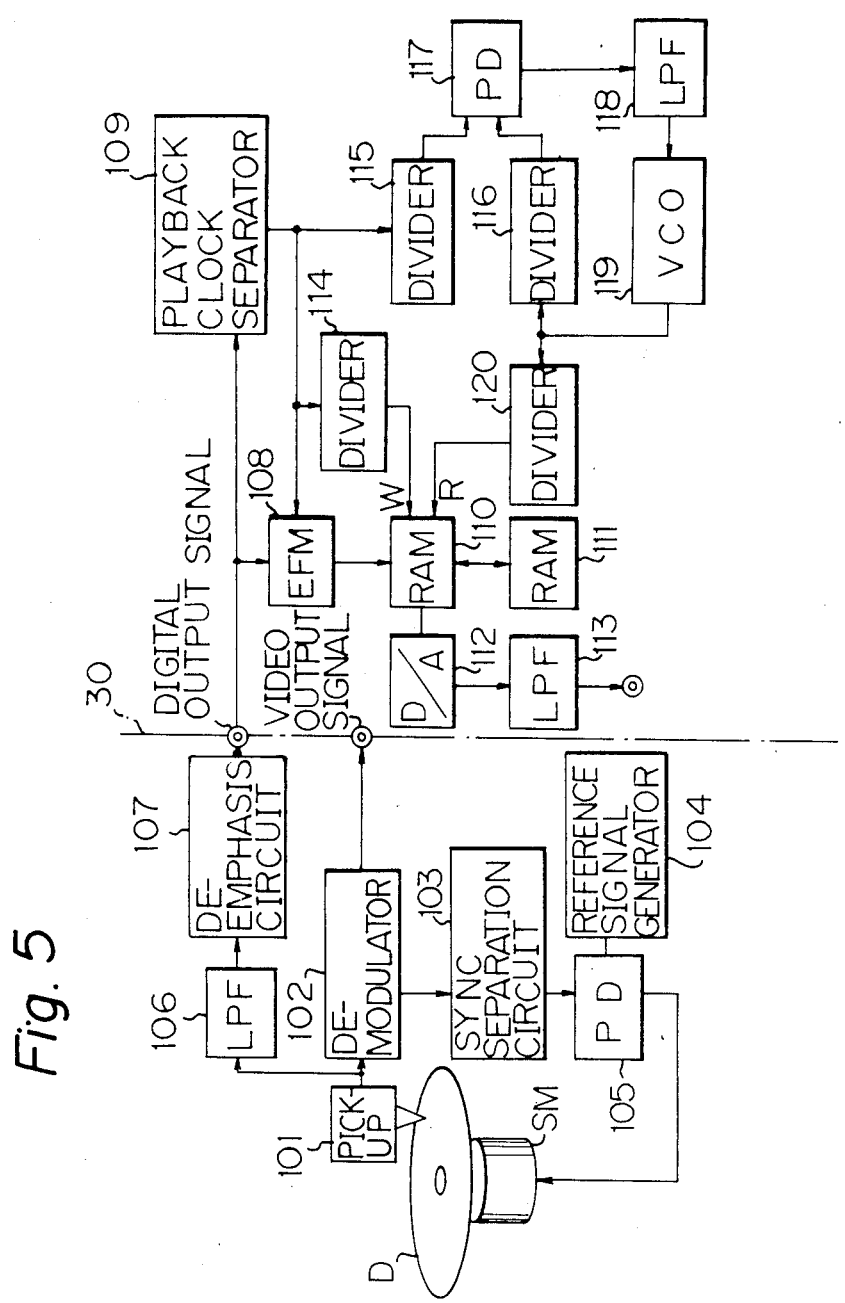
FIG. 5 is a block diagram of an embodiment of the system for demodulating the PCM digital signal recorded on an information recording disc.

In FIG. 5, the construction of the video disc player system is depicted in a portion of figure on the left hand side of the partially dotted line.

As shown, a read out signal picked up from a disc D by means of a pickup 101 is demodulated at a video demodulator 102 where a playback video signal is generated. From this playback signal, a playback synchronizing signal is separated at a separator 103, and then phase compared with a reference signal from a reference signal generator 104 at a phase comparator 105. A comparator output signal from this comparator 105 is in turn used as a servo signal for controlling the driving of a spindle motor and thus the rotation of the recording disc D is controlled.

The read out output signal from the pickup is also applied to a LPF (Low Pass Filter) 106 and a PCM audio signal is picked up. This PCM audio signal takes the form of the EFM signal, for example, and in turn derived as a system output signal via a de-emphasis circuit 107.

This output signal is, in turn, applied to an EFM demodulation circuit 108 and to a clock circuit 109 and demodulated to a PCM digital signal in accordance with a playback clock signal.

This demodulation signal is in turn written within a RAM (Random Access Memory) 111 via a RAM controller 110 in accordance with an output signal of a divider 114 of the playback clock signal.

The read out of the signal from the RAM 111 is performed by a divider output signal of the divider 120 for dividing the output signal of the VCO (Voltage Controlled Oscillator) 119 contained in a PLL (Phase Locked Loop) circuit. The PLL circuit is made up of a PD (Phase Discriminator) 117 for receiving output signals of a divider 115 of the playback output signal and a divider 116 of the VCO 119, a LPF (Low Pass Filter) 118 for receiving the output signal of the PD 117, and the above mentioned VCO 119.

With this construction, the read out clock signal is synchronized in phase with the playback clock signal.

The thus read out digital signal is then applied to a D/A (Digital to Analog) converter 112 and in turn to a LPF 113 whereby transformed into the audio signal and provided as a playback audio signal.

Also in this embodiment, the digital information can be such information of control data used for the control of a playback system.

According to the thus constructed demodulation system according to the present invention, the read out clock signal from the RAM 111 is synchronized with the playback clock signal present at the time of the writing of the data in the RAM 111. Therefore there is no fear of generation of the frequency difference between these two clock signals, and there is no fear of the accumulation of residual data in the RAM 111. Accordingly it is not necessary to increase the capacity of the RAM 111.

In addition, since the jitter is removed from the read out clock signal by the range limiting operation of the loop filter 118 within the PLL circuit, a high quality playback signal will be obtained.

Moreover, by forming the circuit parts of the right hand side of the patially dotted line 30, as an adapter of a demodulation circuit for the digital audio system, the varsitility of the system will become very good. For instance, it will be sufficient to connect the input terminal of the adapter to the digital audio output terminal of the video disc player system.

Specifically, in addition of the capability of the playback of the video disc and the digital audio disc, it becomes possible to play a video disc which carries a recording signal consisting of a pulse train signal obtained by a predetermined digital modulation of an audio signal, superimposed on FM signals of the video signal and the audio signal.

Further, it should be noted that the digital information demodulating system of the invention can be used in the so called compatible disc player system which is originally designed for playing various type of information discs.

What is claimed is:

1. A system for playing back recorded information on a recording disc including a pickup for picking up information from the recording disc, comprising:
   demodulating means for demodulating a playback digital signal obtained from a pickup output signal of said pickup and producing a demodulation signal;
   playback clock signal generating means for generating a playback clock signal from said playback digital signal;
   memory means for storing said demodulation signal from said demodulation means;
   writing means for writing said demodulation signal from said demodulation means in said memory means in accordance with said playback clock signal;
   clock signal generating means for generating a read out clock signal for reading out stored information from said memory means;
   phase synchronizing means for synchronizing in phase said read out clock signal from said clock signal generating means with said playback clock signal;
   monitoring means for monitoring the state of use of said memory means and producing output signals corresponding to a memory utilization factor of said memory means; and
   control means for controlling the frequency of said read out clock signal from said clock signal generating means in accordance with said output signals from said monitoring means.

2. A recording disc playback system adapted for playing a first type recording disc on which a frequency modulated audio signal, a frequency modulated video signal, and a predetermined digital signal are recorded after superimposition with each other, and a second type recording disc on which a predetermined information is recorded after being treated by a predetermined digital modulation process initially and subsequently converted to a pulse train for recording. comprising:
   pickup means for picking up information recorded on one of said first and second types of recording disc and producing a pickup output signal;
   demodulation means for demodulating a playback digital signal obtained from the pickup output signal in accordance with a predetermined demodulation process and generating a demodulation signal;
   playback clock signal generating means for generating a playback clock signal from said playback digital signal;
   memory means for storing said demodulation signal from said demodulation means;
   writing means for writing said demodulation signal in said memory means in synchronism with said playback clock signal;
   clock signal generating means for generating a read out clock signal for reading out stored information from said memory means;
   phase synchronizing means for synchronizing in phase said read out clock signal with said playback clock signal; and
   means for inhibiting phase synchronizing by said phase synchronizing means and for fixing the frequency of said read out clock signal in case of the playback of said second type of recording disc.

3. A system for playing back information recorded on a recording disc including a pickup for picking up information from the disc, comprising:
   demodulating means for demodulating a playback digital signal obtained from a pickup output signal of the pickup and producing a demodulation signal;
   first clock signal generating means for generating a first clock signal synchronized with a playback clock signal component contained in the playback digital signal;
   memory means for memorizing the demodulation signal;
   writing means for writing said demodulation signal in said memory means in accordance with a writing clock signal produced by dividing said first clock signal;
   second clock signal generating means for generating a read out clock signal for reading out stored information from said memory means; and
   phase synchronizing means for synchronizing in phase said read out clock signal with said writing clock signal,
   wherein said first clock signal generating means includes a voltage controlled oscillator for generating said first clock signal, a phase comparator for comparing in phase said playback digital signal and said first clock signal and producing a control voltage whose level is equal to the phase difference between said playback digital signal and said first clock signal, and a switch-over means for alternatively supplying said control voltage and a predetermined reference voltage from a predetermined source of reference voltage to said voltage controlled oscillator.

4. A playback system as set forth in claim 3, further comprising control means for controllably driving of said disc which can be operated under an unlocked state of said control means, wherein said switch-over means selects said reference voltage when said control means is operated under the unlocked state.

5. A playback system as set forth in claim 3, further comprising system control means for controlling playback operation of the system and wherein said switch-over means selects said reference voltage when a random access command is produced by said system control means.

6. A digital information demodulating system for demodulating a playback digital signal, comprising:
   demodulating means for demodulating playback digital information of said playback digital signal and producing a demodulation signal;
   memory means for storing said demodulation signal;
   writing means for writing the demodulation signal in the memory means in accordance with a playback clock signal;
   playback clock signal generating means for generating said playback clock signal from said playback digital information;
   clock signal generating means for generating a read out clock signal for reading out stored information from said memory means; and
   phase synchronizing means for synchronizing in phase said read out clock signal from said clock signal generating means to said playback clock signal, wherein an output signal from said memory means is derived in analog form.

7. A digital information demodulation apparatus as set forth in claim 6, wherein said phase synchronizing means is provided, in a control loop, with a loop filter having a limited bandwidth.

8. A digital information demodulation apparatus as set forth in claim 6, wherein said playback digital signal is a digital information signal picked up from a playback signal of a video playback system.

9. A digital information demodulating system for demodulating a playback digital signal, comprising:
   demodulating means for demodualting playback digital informtaion of said playback digital signal and producing a demodulation signal;
   memory means for storing said demodulation signal;
   writing means for writing the demodulation signal in the memory means in accordance with a playback clock signal;
   playback clock signal generating means for generating said playback clock signal from said playback digital information;
   clock signal generating means for generating a read out clock signal for reading out stored information from said memory means; and
   phase synchronizing means for synchronizing in phase said read out clock signal from said clock signal generating means to said playback clock signal, wherein stored information is read out from said memory means in synchronism with said read out clock signal.

10. A digital information demodulation system as set forth in claim 9, wherein said phase synchronizing means includes a loop filter of a limited bandwidth.

11. A digital information demodulation system as set forth in claim 9, wherein said playback digital signal is a digital information signal picked up from a playback signal of the playback system.

* * * * *